(12) United States Patent
Phillips et al.

(10) Patent No.: US 6,190,447 B1
(45) Date of Patent: Feb. 20, 2001

(54) PROCESS FOR REMOVING OF DOMESTIC WASTE INCINERATOR RESIDUE

(75) Inventors: Paul Phillips, West Sussex; Malcolm Smart, Kent, both of (GB)

(73) Assignee: Aggregate Industries, Inc., Bethesda, MD (US)

( * ) Notice: Under 35 U.S.C. 154(b), the term of this patent shall be extended for 0 days.

(21) Appl. No.: 09/297,292

(22) PCT Filed: Oct. 28, 1997

(86) PCT No.: PCT/GB97/02968

§ 371 Date: Aug. 30, 1999

§ 102(e) Date: Aug. 30, 1999

(87) PCT Pub. No.: WO98/18864

PCT Pub. Date: May 7, 1998

(30) Foreign Application Priority Data

Oct. 28, 1996 (GB) .................................. 9622355

(51) Int. Cl.[7] .................................. C09D 195/00
(52) U.S. Cl. .................... 106/284.01; 106/284.02; 588/256
(58) Field of Search ........................ 106/284.01, 284.02, 106/284.05; 588/256, 257

(56) References Cited

U.S. PATENT DOCUMENTS 3,907,582 * 9/1975 Walter .................. 106/284.02

FOREIGN PATENT DOCUMENTS

| 88 471 | 10/1995 | (DE) . |
| 0 323 095 | 7/1989 | (EP) . |
| 0 550 303 | 7/1993 | (EP) . |
| 82 20374 | 6/1983 | (FR) . |
| 1 415 572 | 11/1975 | (GB) . |

OTHER PUBLICATIONS

Patent Abstract of JP–A–63–268802 (Feb. 1989).
Patent Abstract of JP–A–51–125411 (Jul. 1977).
Pindzola et al., "Technology for Use of Incinerator Residue as Highway Material: Identification of Incinerator Practices and Residue Sources," Valley Forge Laboratories, Federal Highway Administration, Franklin Institute Research Labvoratories, Report No. FHWA–75–81 (Jul. 1975).

Pavlovich et al., "Installation of Incinerator Residue as Base–Course Paving Material in Washington, DC," U.S. Department of Commerce, National Technical Information Service, PB80–125776, Federal Highway Administration, Washington, DC, Report No. FHWA–78–114 (Dec. 1977).

Haynes et al., "Incinerator Residue in Bituminous Base Construction," Texas Transportation Institute, Federal Highway Administration, Report No. FHWA–76–12 (Dec. 1975).

Collins et al., "Guidelines for Use of Incinerator Residue as Highway Construction Material," Valley Forge Laboratories, Inc., Federal Highway Administration, Report No. FHWA–RD–77–150, PB 287512 (Sep. 1977).

Teague et al., "Three Year Results on the Performance of Incinerator Residue in a Bituminous Base," Texas Transportation Institute, Federal Highway Administration, Report No. FHWA–RD–78–144, PB 297978 (Aug. 1978).

Eymael et al., "The Use of MSWI Bottom Ash in Asphalt Concrete", *Elsevier Science*:851–862 (1994)*.

Mank et al., "Incineration Slag in Road Constructions," *Waste Materials in Construction*, Elsevier Science:187–195 (1991).

"Verwendung von geringerwertigen Materialien in einer Hei©mischfundationsschicht," K. Amort, Bitumen, pp. 2–11 (Jan. 1988).

"Verwendung von Müllverbrennungsaschen als Zuschlagstoff zu Asphalt—Überlegungen zu möglichen Aufbereitungsmaßnahmen," K. Amort, Bitumen, pp. 119–124 (Mar. 1988).

* cited by examiner

*Primary Examiner*—David Brunsman
(74) *Attorney, Agent, or Firm*—Morrison & Foerster LLP

(57) ABSTRACT

A process is provided for the remediation of bottom ash from domestic waste incinerators which comprises hot mixing from 10 to 50% by weight of said bottom ash with from 4 to 6% by weight of bitumen having a penetration of from 50 to 200 pen, from 25 to 55% by weight of crushed rock having a particle size greater than 2 mm, from 10 to 35% by weight of crushed rock fines having a particle size of less than 2 mm and from 0 to 3% by weight of a filler to give a hot mix asphalt product which is environmentally stable and which has load bearing properties at least as good as conventional hot mix asphalts.

11 Claims, 1 Drawing Sheet

PROCESS FOR REMOVING OF DOMESTIC WASTE INCINERATOR RESIDUE

The present invention relates to a method for the remediation of bottom ash from domestic waste incinerators and the production of an asphalt which is suitable for use in the construction of roads.

The ever-increasing volume of domestic waste has resulted in a considerable pressure on available landfill space. One process that has been developed to reduce this pressure is the incineration of the waste in high-temperature incinerators at combined heat and power facilities. In this process, domestic waste is incinerated at temperatures of 1000° C. or more, producing electricity, steam, fly ash and bottom ash (the latter is also known as domestic waste incinerator residue—D.I.R). The bottom ash and fly ash differ both in particle size and chemical composition. Some metals can be retrieved from this bottom ash (e.g. by electromagnetic and eddy current separation), but this still leaves a mass of material which until now has had no use and was simply disposed of in landfill sites. Even this disposal causes problems, because of high metal concentrations in leachate produced from the bottom ash. In particular, the levels of lead, copper, zinc and chromium are greater than the relevant environmental guidelines (drinking water and groundwater guidelines).

It would be highly desirable, therefore, to develop a process for the remediation of bottom ash from domestic waste incinerators to give a material whose leachate was more environmentally stable. Furthermore, it would be desirable for the remediation process to give a material with useful properties rather than simply disposing of it in landfill sites.

Asphalt stabilisation is a remediation technology that has been developed and applied for some considerable times. The process is designed to bind contaminated material in a stable product, reducing risks associated with dermal contact, ingestion and leaching of contaminants to groundwater and surface water. In addition, the process eliminates the need for landfill disposal of contaminated material and associated environmental problems that may arise.

Currently, technology of this type is used to recycle road plannings, reducing the demand for virgin aggregates and recycling the old road surface material. Two methods are used to process materials, hot mix bituminous concrete production and the cold mix method. In these processes an asphalt binder is mixed with soil/stone aggregate and blended to ensure each soil grain and stone aggregate is coated with a thin layer of asphalt. In order to mix the asphalt binder, which is a solid at room temperature, with the aggregate it must be in a liquefied form. Hot mix bituminous concrete production uses heat to liquefy the solid asphalt. The cold mix process, also known as Asphalt Emulsion Stabilisation (AES), uses a mixture of water and surfactants to get asphalt into a workable liquid form.

Asphalt stabilisation has not, however, previously been successfully applied to the remediation of bottom ash from domestic waste incinerators. It is an object of the present invention to provide a process of remediating bottom ash from domestic waste incinerators using asphalt stabilisation technology. It is a further object of the invention to provide a remediated product which is both environmentally stable and suitable for use in the construction of roads.

Thus, in a first aspect of the present invention there is provided a process for the remediation of bottom ash from domestic waste incinerators comprising hot mixing from 10 to 50% by weight of said bottom ash with from 4 to 6% by weight of bitumen having a penetration of from 50 to 200 pen, from 25 to 55% by weight of crushed rock having a particle size greater than 2 mm, from 10 to 35% by weight of crushed rock fines having a particle size less than 2 mm and from 0 to 3% by weight of a filler to give a hot mix asphalt product.

This process remediates the bottom ash to give an asphalt product which is more environmentally stable, particularly with regard to leachate levels of metals such as lead, copper and zinc, and which has similar properties to conventional hot mix asphalts obtained from virgin aggregate, making it suitable for use in the construction of roads.

In a further aspect of the present invention, there is provided a hot mix asphalt comprising from 10 to 50% by weight of bottom ash from a domestic waste incinerator, from 4 to 6% by weight of bitumen having a penetration of from 50 to 200 pen, from 25 to 55% by weight of crushed rock having a particle size of greater than 2 mm, from 10 to 35% by weight of crushed rock fines having a particle size of less than 2 mm and from 0 to 3% by weight of a filler.

The bitumen used in the present invention has a penetration of from 50 to 200 pen, as determined according to British Standard Specification (B.S.) 3690 (a test which is based on viscosity ranking test; 1 pen=0.1 mm). Preferably, from 4.7 to 5.5% by weight of bitumen is added to the hot mix.

The crushed rock used in the present invention is the coarse aggregate element and refers to the particles whose size exceeds 2 mm, as tested using the appropriate British Standard test sieve. It is obtained from the quarry process of blasting, crushing and screening of a mineral deposit. The crushed rock used can be any conventionally used in the production of hot mix asphalts e.g. limestone and granite. Preferably, from 29 to 52% by weight of crushed rock is added to the hot mix.

The crushed rock fines are particles whose size is less than 2 mm, as tested by the appropriate B.S. test sieve, and are obtained from the same quarry process on the crushed rock. Preferably, from 12.5 to 32% by weight of crushed rock fines are added to the hot mix.

The fillers used are those conventionally used in the production of hot mix asphalts. They are generally powders whose particle size is substantially less than 75 $\mu$m as tested by the appropriate British Standard test sieve. Examples of suitable fillers include the product of milling limestone aggregate. Preferably 2% by weight of filler is added.

In a preferred embodiment of the present invention, the bottom ash is subjected to electromagnetic and eddy current separation before the mixing process to remove substantially all of the ferrous metal and up to 60% of the non-ferrous metal. The bottom ash can also, preferably, be crushed and screened to reduce the average particle size before the mixing process.

The precise amounts of the different components can be varied according to the intended use for the asphalt product. Thus, for example, surface course material which complies with the requirements of 10 mm wearing coarse British Standard 4987 (in terms of gradation, binder content and temperature for mix and lay) is obtained by hot mixing the following components according to the process of the present invention.

| Raw Materials | % Composition | | |
|---|---|---|---|
| Domestic Waste Incinerator Residue | 10 | 20 | 50 |
| Bitumen 50 pen, 100 pen, 200 pen | 5.5 | 5.5 | 5.5 |
| Crushed Rock | 52 | 46 | 30 |
| Crushed Rock fines | 30.5 | 26.5 | 12.5 |
| Limestone Filler | 2 | 2 | 2 |

Basecourse asphalt which complies with the requirements of a 20 mm dense basecourse macadam British Standard 4987 (in terms of gradation, binder content and temperature of mix and lay) is obtained by hot mixing the following components according to the present invention.

| | % Composition | | |
|---|---|---|---|
| Raw Materials | Mix A | Mix B | Mix C |
| Domestic Waste Incinerator Residue | 10 | 20 | 50 |
| 50 Pen Bitumen | 5 | 5 | 5 |
| Screened Crushed Rock | 51 | 45 | 20 |
| Crushed Rock Fines | 32 | 28 | 14 |
| Limestone Filler | 2 | 2 | 2 |

The present invention can be further understood by consideration of the following examples, in which the reduction in leachate metal concentrations and the loading bearing properties of the hot mix asphalt of the present invention were tested.

Using a hot mix asphalt plant, the following materials were combined according to the present invention to give an asphalt which met the requirements of British Standard 4987 as a basecourse macadam.

| Component | Source | % by weight |
|---|---|---|
| Coarse Aggregate | Bardon Hill Quarry Hardstone aggregate | 28.3 |
| Fine Aggregate | Bardon Hill Quarry Hardstone aggregate | 15.0 |
| D.I.R. | South East London Combined Heat and Power, Deptford | 50.0 |
| 100 Pen Bitumen | B.P. Bitumen Llandarcy | 4.7 |
| Limestone Filler | Francis Flowers, Somerset | 2.0 |

The concentration of various metals in the leachates from the bottom ash (D.I.R.) were compared with those obtained from hot mix product containing 100% virgin aggregate (i.e. no bottom ash) and those obtained from the test hot mix asphalt prepared as stated above. The three samples were prepared for National Rivers Authority (UK) Leaching Tests (NRA, 1994). The bottom ash sample and the two processed materials were crushed with a jaw crusher to produce a particle size of less than 5 mm. A sample of bottom ash was subdivided out for total metal analyses. The crushed samples were then coned and quartered to produce four samples for leach tests. All four sub-samples of each material were processed according to the NRA procedure. Leachate "black" samples with no added material were also run through the procedure for quality control analyses.

Bottom ash (solid) samples and all leachate samples were analysed for the following metals:

Silver (Ag)
Arsenic (As)
Boron (B)
Cadmium (Cd)
Cobalt (Co)
Chromium (Cr)
Copper (Cu)
Mercury (Hg)
Molybdenum (Mo)
Nickel (Ni)
Lead (Pb)
Antimony (Sb)
Selenium (Se)
Tin (Sn)
Tellurium (Te)
Thallium (Tl)
Zinc (Zn)

The results of the analyses are presented in the following Tables 1 through 6. Total metal concentrations in bottom ash were measured in duplicated and are documented in Table 1 with average concentrations shown in Table 2. Levels of lead and chromium in the ash were greater than ICRCL guidelines (ICRCL, 59/83, 2nd Edition, July 1987), commonly used to gauge the significance of soil contamination at developments sites.

Metal concentrations in leachates from bottom ash, hot mix and hot mix product with added ash are shown in Tables 3, 4 and 5 respectively. The average concentration in the four leachates from each material were calculated. As seen in Table 6, the concentration of several metal including copper (Cu), lead (Pb) and zinc (Zn) were above available environmental standards in the bottom ash leachate. The concentrations in leachate were compared to Dutch groundwater guidelines and the EU drinking water directive (Council of the European Communities, 80/778 EEC:OJL 229, Aug. 30, 1980) that forms the basis for UK drinking water standards. It is important to note that leach test conditions including the small particle size required to conduct the leach test may over estimate any actual concentrations that may arise in the environment due to natural leaching of this material.

Table 6 also includes the calculated percent reduction in leachate metal concentrations comparing bottom ash leachate and hot mix product with incorporated bottom ash. Generally, the higher concentration metal species in the bottom ash leachate showed the greatest percent reduction in the hot mix product.

Figure 1:
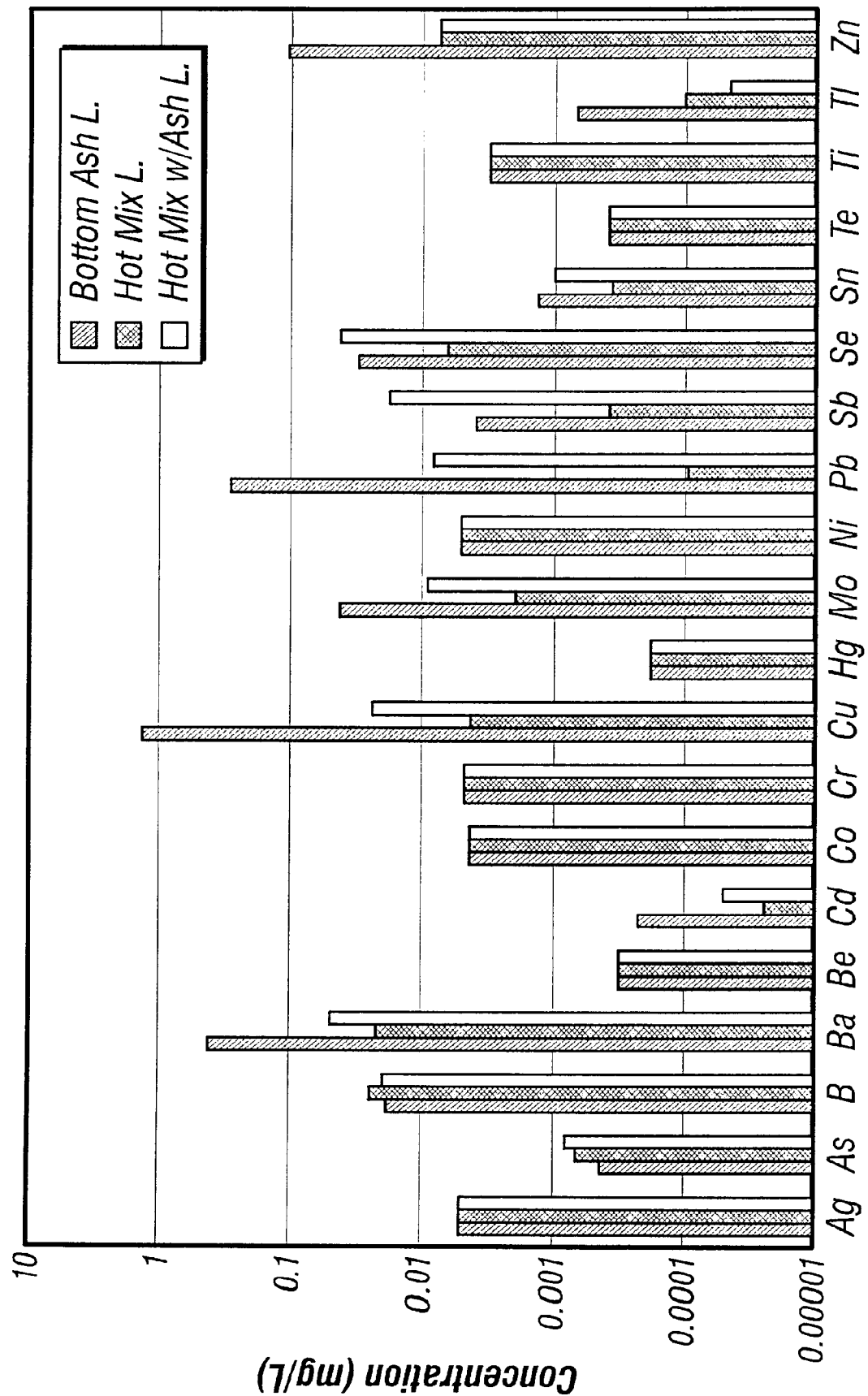
FIG. 1 shows the relative concentrations for bottom ash leachate, hot mix leachate and hot mix with ash leachate. The concentrations are plotted on a log scale due to the large range of concentrations in the leachates. Where metals were below detection limits, the plots in FIG. 1 indicate a concentration set at half the detection limit. Lead, copper and zinc were above relevant environmental guidelines in the bottom ash leachate and were reduced in the hot mix product between 93 and 98 percent. All three metals were below the environmental guidelines in the hot mix with ash product leachate. Metals present in the bottom ash leachate at low concentration have similar levels in the hot mix with ash product. Only a few metals were found in the basic hot mix (no added ash) leachate at low concentration.

Overall the percent reduction in leachate metals concentrations indicates the hot mix processing of incinerator bottom ash produces an environmentally more stable material, binding metals in a form that restricts environmental leaching of metal contaminants. The leaching test represents conditions more favourable to leaching than would be expected for hot mix production in its proposed use.

The product can be used for paving roads forming a low permeability material compacted during road surfacing. In the leaching test the material was crushed into a finely divided state with a particle size less than 5 mm, thus creating a much larger surface area than would be the case for the paving material in common use. In addition, significant dilution of any leachate generated from the pavement would further reduce any concentration in the environment.

TABLE 1

Bottom ash total metals

| Species | Detection Limit (mg/kg) | Test 1 (mg/kg) | Test 2 (mg/kg) |
|---|---|---|---|
| Ag | 0.02 | 0.74 | 0.49 |
| As | 2 | 6 | 8 |
| B | 1 | 94 | 74 |
| Ba | 0.1 | 460 | 480 |
| Be | 0.02 | 0.57 | 0.47 |
| Cd | 0.2 | 3.7 | 2.8 |
| Co | 0.3 | 15 | 13 |
| Cr | 0.3 | 79 | 140 |
| Cu | 0.3 | 1500 | 930 |
| Hg | 1 | ND | ND |
| Mo | 0.1 | 14 | 13 |
| Ni | 0.3 | 66 | 250 |
| Pb | 0.5 | 1600 | 1300 |
| Sb | 0.1 | 34 | 28 |
| Se | 9 | ND | ND |
| Sn | 0.3 | 93 | 80 |
| Te | 3 | ND | 4 |
| Ti | 0.2 | 1600 | 1300 |
| Tl | 0.4 | 1 | 6.8 |
| Zn | 0.2 | 1200 | 930 |

ND (Not Detected)

TABLE 2

Average metal concentration in bottom ash

| Species | Detection Limit (mg/kg) | Test 1 (mg/kg) | Test 2 (mg/kg) | Average Concentration (mg/kg) |
|---|---|---|---|---|
| Ag | 0.02 | 0.74 | 0.49 | 0.615 |
| As | 2 | 6 | 8 | 7 |
| B | 1 | 94 | 74 | 84 |
| Ba | 0.1 | 460 | 480 | 470 |
| Be | 0.02 | 0.57 | 0.47 | 0.52 |
| Cd | 0.2 | 3.7 | 2.8 | 3.25 |
| Co | 0.3 | 15 | 13 | 14 |
| Cr | 0.3 | 79 | 140 | 109.5 |
| Cu | 0.3 | 1500 | 930 | 1215 |
| Hg | 1 | 0.5 | 0.5 | 0.5 |
| Mo | 0.1 | 14 | 13 | 13.5 |
| Ni | 0.3 | 66 | 250 | 158 |
| Pb | 0.5 | 1600 | 1300 | 1450 |
| Sb | 0.1 | 34 | 28 | 31 |
| Se | 9 | 4.5 | 4.5 | 4.5 |
| Sn | 0.3 | 93 | 80 | 86.5 |
| Te | 3 | 1.5 | 4 | 2.75 |
| Ti | 0.2 | 1600 | 1300 | 1450 |
| Tl | 0.4 | 1 | 6.8 | 3.9 |
| Zn | 0.2 | 1200 | 930 | 1065 |

Non-detected species set at 0.5 Detection Limit

TABLE 3

Metals concentrations in bottom ash leachates

| Species | Detection Limit (mg/l) | Blank (mg/l) | Bottom Ash Leachate Test 1 (mg/l) | Bottom Ash Leachate Test 2 (mg/l) | Bottom Ash Leachate Test 3 (mg/l) | Bottom Ash Leachate Test 4 (mg/l) |
|---|---|---|---|---|---|---|
| Ag | 0.01 | ND | ND | ND | ND | ND |
| As | 0.0006 | ND | 0.001 | ND | ND | ND |
| B | 0.04 | ND | ND | ND | ND | ND |
| Ba | 0.004 | ND | 0.46 | 0.44 | 0.39 | 0.41 |
| Be | 0.0007 | ND | ND | ND | ND | ND |
| Cd | 0.00005 | ND | 0.0001 | 0.0004 | 0.0002 | 0.0003 |
| Co | 0.009 | ND | ND | ND | ND | ND |
| Cr | 0.01 | ND | ND | ND | ND | ND |
| Cu | 0.009 | ND | 1.4 | 1.3 | 1.3 | 1.4 |
| Hg | 0.0004 | ND | ND | ND | ND | ND |
| Mo | 0.004 | ND | 0.047 | 0.044 | 0.044 | 0.046 |
| Ni | 0.01 | ND | ND | ND | ND | ND |
| Pb | 0.0002 | ND | 0.38 | 0.29 | 0.26 | 0.27 |
| Sb | 0.00004 | ND | 0.0039 | 0.0045 | 0.0044 | 0.0042 |
| Se | 0.003 | ND | 0.035 | 0.02 | 0.035 | 0.037 |
| Sn | 0.0001 | 0.0005 | 0.0012 | 0.0015 | 0.0014 | 0.0015 |
| Te | 0.0009 | ND | ND | ND | ND | ND |
| Ti | 0.007 | ND | ND | ND | ND | ND |
| Tl | 0.0001 | ND | ND | 0.0016 | 0.0014 | ND |
| Zn | 0.006 | 0.008 | 0.13 | 0.13 | 0.094 | 0.095 |

TABLE 4

Metal concentrations in hot mix leachate

| Species | Detection Limit (mg/l) | Blank (mg/l) | Hot Mix Leachate Test 1 (mg/l) | Hot Mix Leachate Test 2 (mg/l) | Hot Mix Leachate Test 3 (mg/l) | Hot Mix Leachate Test 4 (mg/l) |
|---|---|---|---|---|---|---|
| Ag | 0.01 | ND | ND | ND | ND | ND |
| As | 0.0006 | ND | ND | 0.002 | ND | ND |
| B | 0.04 | ND | ND | ND | 0.04 | ND |
| Ba | 0.004 | ND | 0.03 | 0.02 | 0.02 | 0.02 |
| Be | 0.0007 | ND | ND | ND | ND | ND |
| Cd | 0.00005 | ND | ND | ND | ND | ND |
| Co | 0.009 | ND | ND | ND | ND | ND |
| Cr | 0.01 | ND | ND | ND | ND | ND |
| Cu | 0.009 | ND | ND | ND | ND | ND |
| Hg | 0.0004 | ND | ND | ND | ND | ND |
| Mo | 0.004 | ND | ND | ND | ND | ND |
| Ni | 0.01 | ND | ND | ND | ND | ND |
| Pb | 0.0002 | ND | ND | ND | ND | ND |
| Sb | 0.00004 | ND | 0.00053 | 0.00042 | 0.0003 | 0.0004 |
| Se | 0.003 | ND | 0.008 | 0.008 | 0.005 | 0.005 |
| Sn | 0.0001 | 0.0005 | 0.0004 | 0.0005 | 0.0003 | 0.0004 |
| Te | 0.0009 | ND | ND | ND | ND | ND |
| Ti | 0.007 | ND | ND | ND | ND | ND |
| Tl | 0.0001 | ND | ND | 0.0003 | ND | ND |
| Zn | 0.006 | 0.008 | 0.02 | ND | 0.007 | ND |

TABLE 5

Metal concentrations in hot mix with bottom ash leachate

| Species | Detection Limit (mg/l) | Blank (mg/l) | Hot Mix w/bottom ash Leachate Test 1 (mg/l) | Hot Mix w/bottom ash Leachate Test 2 (mg/l) | Hot Mix w/bottom ash Leachate Test 3 (mg/l) | Hot Mix w/bottom ash Leachate Test 4 (mg/l) |
|---|---|---|---|---|---|---|
| Ag | 0.01 | ND | ND | ND | ND | ND |
| As | 0.0006 | ND | 0.002 | 0.001 | ND | ND |
| B | 0.04 | ND | ND | ND | ND | ND |
| Ba | 0.004 | ND | 0.051 | 0.048 | 0.049 | 0.057 |

TABLE 5-continued

Metal concentrations in hot mix with bottom ash leachate

| Species | Detection Limit (mg/l) | Blank (mg/l) | Hot Mix w/bottom ash Leachate Test 1 (mg/l) | Hot Mix w/bottom ash Leachate Test 2 (mg/l) | Hot Mix w/bottom ash Leachate Test 3 (mg/l) | Hot Mix w/bottom ash Leachate Test 4 (mg/l) |
|---|---|---|---|---|---|---|
| Be | 0.0007 | ND | ND | ND | ND | ND |
| Cd | 0.00005 | ND | 0.00007 | 0.00009 | ND | ND |
| Co | 0.009 | ND | ND | ND | ND | ND |
| Cr | 0.01 | ND | ND | ND | ND | ND |
| Cu | 0.009 | ND | 0.03 | 0.02 | 0.02 | 0.03 |
| Hg | 0.0004 | ND | ND | ND | ND | ND |
| Mo | 0.004 | ND | 0.01 | 0.009 | 0.01 | 0.01 |
| Ni | 0.01 | ND | ND | ND | ND | ND |
| Pb | 0.0002 | ND | 0.0086 | 0.008 | 0.0082 | 0.0096 |
| Sb | 0.00004 | ND | 0.018 | 0.018 | 0.019 | 0.02 |
| Se | 0.003 | ND | 0.052 | 0.046 | 0.041 | 0.047 |
| Sn | 0.0001 | 0.0005 | 0.001 | 0.0011 | 0.001 | 0.0011 |
| Te | 0.0009 | ND | ND | ND | ND | ND |
| Ti | 0.007 | ND | ND | ND | ND | ND |
| Tl | 0.0001 | ND | ND | ND | ND | ND |
| Zn | 0.006 | 0.008 | ND | 0.01 | 0.01 | 0.01 |

TABLE 6

Percent reduction in leachate concentration and environmental standards

| Species | Bottom Ash Leachate (average) (mg/l) | Hot Mix Leachate (average) (mg/l) | Hot Mix w/Bottom Ash Leachate (average) (mg/l) | % Reduction comparing Bottom Ash Leachate with Hot Mix w/Bottom Ash Leachate | Dutch IV (mg/l) | EEC MAC (mg/l) |
|---|---|---|---|---|---|---|
| Ag | 0.005 | 0.005 | 0.005 | 0 | | 0.01 |
| As | 0.000475 | 0.000725 | 0.0009 | −89 | | 0.05 |
| B | 0.02 | 0.025 | 0.02 | 0 | | |
| Ba | 0.425 | 0.0225 | 0.05125 | 88 | 0.625 | |
| Be | 0.00035 | 0.00035 | 0.00035 | 0 | | |
| Cd | 0.00025 | 0.000025 | 0.0000525 | 79 | | 0.005 |
| Co | 0.0045 | 0.0045 | 0.0045 | 0 | 0.1 | |
| Cr | 0.005 | 0.005 | 0.005 | 0 | | 0.05 |
| Cu | 1.35 | 0.0045 | 0.025 | 98 | 0.075 | |
| Hg | 0.0002 | 0.0002 | 0.0002 | 0 | | 0.001 |
| Mo | 0.04525 | 0.002 | 0.00975 | 78 | 0.3 | |
| Ni | 0.005 | 0.005 | 0.005 | 0 | | 0.05 |
| Pb | 0.3 | 0.0001 | 0.0086 | 97 | | 0.05 |
| Sb | 0.00425 | 0.0004125 | 0.01875 | −341 | | 0.01 |
| Se | 0.03175 | 0.0065 | 0.0465 | −46 | | 0.01 |
| Sn | 0.0014 | 0.0004 | 0.00105 | 25 | | |
| Te | 0.00045 | 0.00045 | 0.00045 | 0 | | |
| Ti | 0.0035 | 0.0035 | 0.0035 | 0 | | |
| Tl | 0.000775 | 0.0001125 | 0.00005 | 94 | | |
| Zn | 0.11225 | 0.00825 | 0.00825 | 93 | 0.065 | |

Negative % reduction indicates higher concentration in treated material (only found where original ash contained very low concentrations
(Dutch IV) Dutch groundwater guideline intervention value
(EEC MAC) EU drinking water directive maximum admissible concentration To evaluate its potential as a roadstone for use in the construction of highways, the load bearing properties of the test asphalt of the present invention were determined by measuring its elastic siffness using a Nottingham Asphalt Tester. In all tests performed on the asphalt of the present invention, the load bearing properties were found to be at least as good as conventional hot mix asphalt.

Through careful adjustment of the amounts of the various components combined in the hot mixing process of the present invention, it is possible to obtain asphalts which are suitable for use as basecourses and surface courses in the manufacture of highways.

What is claimed is:

1. A process for remediation of bottom ash from domestic waste incinerators comprising hot mixing from 10 to 50% by weight of said bottom ash with from 4 to 6% by weight of bitumen having a penetration of from 50 to 200 pen, from 25 to 55% by weight of crushed rock having a particle size greater than 2 mm, from 10 to 35% by weight of crushed rock fines having a particles size of less than 2 mm, and from 0 to 3% by weight of a filler to give a hot mix asphalt product.

2. A process according to claim 1, wherein 4.7 to 5.5% by weight of bitumen is present in the hot mix composition.

3. A process according to claim 1, wherein from 29 to 52% by weight of crushed rock having a particle size greater than 2 mm is present in the hot mix composition.

4. A process according to claim 1, wherein from 12.5 to 32% by weight of crushed rock fines is present in the hot mix composition.

5. A process according to claim 1, wherein 2% by weight of filler is present in the hot mix composition.

6. A process according to claim 1, wherein the filler is a limestone filler having an average particle size of less than 75 μm.

7. A process according to claim 1, wherein the bottom ash is subjected to electromagnetic and eddy current separation before the hot mixing.

8. A process according to claim 1, comprising hot mixing one of the following compositions:
   (a) 10% by weight of bottom ash, 5.5% by weight of bitumen, 52% by weight of crushed rock, 30.5% by weight of crushed rock fines and 2% by weight of limestone filler;
   (b) 20% by weight of bottom ash, 5.5% by weight of bitumen, 46% by weight of crushed rock, 26.5% by weight of crushed rock fines and 2% by weight of limestone filler; or
   (c) 50% by weight of bottom ash, 5.5% by weight of bitumen, 30% by weight of crushed rock, 12.5% by weight of crushed rock fines and 2% by weight of limestone filler.

9. A process according to claim 1, comprising hot mixing one of the following compositions:
 (a) 10% by weight of bottom ash, 5% by weight of bitumen, 51% by weight of crushed rock, 32% by weight of crushed rock fines and 2% by weight of limestone filler;
 (b) 20% by weight of bottom ash, 5% by weight of bitumen, 45% by weight of crushed rock, 28% by weight of crushed rock fines and 2% by weight of limestone filler; or
 (c) 50% by weight of bottom has, 5% by weight of bitumen, 29% by weight of crushed rock, 14% by weight of crushed rock fines and 2% by weight of limestone filler.

10. A process according to claim 1, comprising hot mixing 50% by weight of bottom ash, 4.7% by weight of bitumen having a penetration of 100 pen, 28.3% by weight of crushed rock, 15.0% by weight of crushed rock fines and 2% by weight of limestone filler.

11. A hot mix asphalt obtainable according to the process claim 1.

* * * * *